UNITED STATES PATENT OFFICE.

DUNCAN W. PECK, OF SYRACUSE, NEW YORK.

PROCESS OF PRODUCING ARTIFICIAL ASPHALT.

SPECIFICATION forming part of Letters Patent No. 624,081, dated May 2, 1899.

Application filed March 30, 1898. Serial No. 675,788. (No specimens.)

*To all whom it may concern:*

Be it known that I, DUNCAN W. PECK, of Syracuse, in the county of Onondaga, in the State of New York, have invented new and useful Improvements in Processes of Producing an Artificial Asphalt for Paving and other Purposes and Uses, of which the following is a full, clear, and exact description.

My invention relates to a process for producing an artificial asphalt for paving and other purposes and uses.

I am aware that compositions for paving and other purposes have heretofore been patented which use substantially the same ingredients which I use in my composition; but my object is to produce an artificial asphalt and cheapen the production and improve the quality of the same by an economical process; and to that end my invention consists in mixing and commingling the several ingredients together substantially as hereinafter described, and more specifically set forth in the claim hereunto annexed.

In preparing this composition I first take equal parts of coal-tar and common rosin placed in a vessel together with from five to eight per cent. of the above ingredients, by weight, of petroleum residuum or other suitable hydrocarbon. The temperature of the mass is then raised to about 320° Fahrenheit while agitating the mixture, when an additional amount of petroleum residuum or other suitable heavy hydrocarbon—say from five to ten per cent. of the above or sufficient to produce the desired softness in the cement—is added gradually, together with from three to five per cent. of sulfur. The sulfur should be added gradually simultaneously with the petroleum residuum and the whole mass thoroughly agitated, the temperature of the mass in the meantime being gradually raised to 350° or 360° Fahrenheit or higher, if necessary, to produce the desired result.

Coal-tar pitch may be substituted for coal-tar, in which case the amount used would be decreased in accordance to the relative value of the material for this use to coal-tar.

The above proportions may be somewhat changed to produce different results, and the final temperature may be carried further, if desired.

I have found it convenient to first mix the sulfur with the hydrocarbon and then add this mixture while the mass is being agitated. I mix the sulfur with the heavy hydrocarbon, not for the purpose of any new result which the hydrocarbon might produce, but for the purpose of affording an easy and convenient means or vehicle by which the sulfur is introduced into the mass under agitation. I am thus enabled to obviate dust, which would otherwise arise and create loss.

I do not limit myself to the introduction into this mass of petroleum residuum, as it will be evident that any suitable heavy hydrocarbon may be used with the same results.

Having described my invention, what I claim, and desire to secure by Letters Patent, is—

The herein-described process for producing artificial asphalt, which consists of mixing coal-tar, rosin and petroleum residuum, raising the temperature while agitating the mixture, substantially as specified, and then adding simultaneously additional petroleum residuum and sulfur while the mass is being agitated.

In witness whereof I have hereunto set my hand this 26th day of March, 1898.

DUNCAN W. PECK.

In presence of—
C. W. SMITH,
MARY A. FRANKLIN.